United States Patent
Bell et al.

(10) Patent No.: US 9,702,406 B2
(45) Date of Patent: Jul. 11, 2017

(54) PLAIN BEARING

(71) Applicants: Andrew Bell, Clevedon (GB); Michael Colton, Bristol (GB); Camille Dayot, Valence (FR); Noemie PEron, Saint-Vallier sur Rhone (FR)

(72) Inventors: Andrew Bell, Clevedon (GB); Michael Colton, Bristol (GB); Camille Dayot, Valence (FR); Noemie PEron, Saint-Vallier sur Rhone (FR)

(73) Assignees: SKF AEROSPACE FRANCE S.A.S., Saint-Vallier (FR); AKTIEBOLAGET SKF, Gothenburg (SE)

( * ) Notice: Subject to any disclaimer, the term of this patent is extended or adjusted under 35 U.S.C. 154(b) by 33 days.

(21) Appl. No.: 14/737,582

(22) Filed: Jun. 12, 2015

(65) Prior Publication Data

US 2015/0362018 A1 Dec. 17, 2015

(30) Foreign Application Priority Data

Jun. 12, 2014 (GB) .................................. 1410485.5

(51) Int. Cl.
*F16C 33/18* (2006.01)
*F16C 33/20* (2006.01)
*F16C 33/10* (2006.01)

(52) U.S. Cl.
CPC .......... *F16C 33/201* (2013.01); *F16C 33/208* (2013.01); *F16C 33/1095* (2013.01); *F16C 33/205* (2013.01); *F16C 2208/02* (2013.01); *F16C 2208/86* (2013.01); *F16C 2240/06* (2013.01); *Y10T 29/49679* (2015.01)

(58) Field of Classification Search
CPC ........ F16C 23/04; F16C 23/043; F16C 33/04; F16C 33/18; F16C 33/28; F16C 33/205; F16C 33/208

See application file for complete search history.

(56) References Cited

U.S. PATENT DOCUMENTS

| | | |
|---|---|---|
| 2003/0022571 A1 | 1/2003 | Ampuero Auza et al. |
| 2008/0104845 A1* | 5/2008 | Lee .................. B29C 33/60 29/898.043 |
| 2011/0220762 A1* | 9/2011 | Gyuricsko ............. B64C 9/22 244/99.3 |
| 2011/0262059 A1 | 10/2011 | Karaki et al. |
| 2013/0183488 A1 | 7/2013 | Liao et al. |

FOREIGN PATENT DOCUMENTS

| | | |
|---|---|---|
| CA | 2871576 A1 | 10/2013 |
| EP | 1837534 A3 | 7/2008 |
| JP | 2002144178 A | 5/2002 |
| WO | 2013042715 A1 | 3/2013 |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing comprising: (a) an inner ring, (b) an outer ring, and (c) a bearing liner disposed therebetween, wherein the bearing liner comprises a resin having a glass transition temperature of less than 150° C.

13 Claims, 3 Drawing Sheets

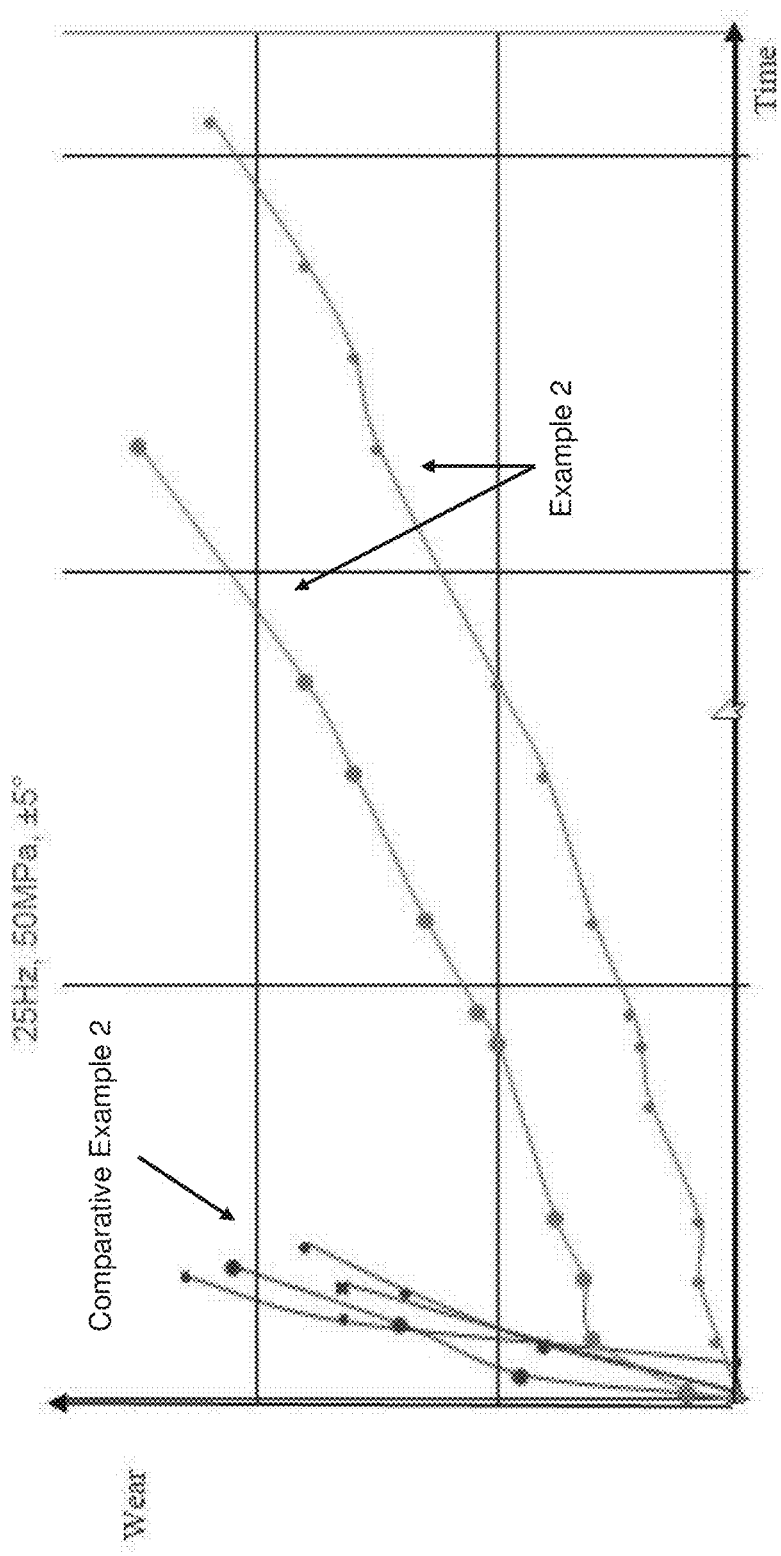

PLAIN BEARING

CROSS REFERENCE TO RELATED APPLICATIONS

This is a Non-Provisional Patent Application, filed under the Paris Convention, claims the benefit of Great Britain Patent (GB) Application Number 1410485.5 filed on 12 Jun. 2014, which is incorporated herein by reference in its entirety.

TECHNICAL FIELD

The present invention relates generally to the field of bearings, and in particular to an improved plain bearing. The plain bearing has a long working lifetime, and may be used in a number of applications, for example high vibration applications.

BACKGROUND

Bearings are devices that permit constrained relative motion between two parts. A plain bearing is the simplest type of bearing, comprising just a bearing surface and no rolling elements. Therefore the journal (i.e. the part of the shaft in contact with the bearing) slides over the bearing surface. The simplest example of a plain bearing is a shaft rotating in a hole. Two-piece plain bearings, known as full bearings in industrial machinery, are commonly used for larger diameters, such as crankshaft bearings. Self-lubricating plain bearings have a lubricant contained within the bearing walls. The lubricant is typically an integral element of the bearing material and remains part of the bearing's makeup for its useful life without the need for outside maintenance.

Plain bearings often contain a liner between the bearing surfaces to reduce friction. Typical prior art fabric liner systems used in self-lubricating bearings comprise a woven fabric combined with a resin binder to form a composite material that can be affixed to bearing surfaces. The fabric component of the composite consists of a top surface of lubricating yarns (typically PTFE), which degrade through motion at the working surface, providing the bearing with lubricant, and structural yarns (typically glass fibers), which help retain the lubricating yarns and provide the composite with its structural integrity.

Due to the temperature requirements stated in aerospace plain bearing specification AS81820 (the bearing is required to operate effectively from −55° C. to +163° C.), the selection of resin binders for composite liners systems has been generally limited to the phenol family. As a result, phenol-based resin binders have become an industry standard in prior art bearing technologies. However, there is a need for plain bearings that exhibit improved wear resistance and therefore increased working lifetime, in particular in high vibration applications.

The present invention seeks to tackle at least some of the problems associated with the prior art or at least to provide a commercially acceptable alternative solution thereto.

BRIEF SUMMARY OF THE INVENTION

In a first aspect, the present invention provides a bearing comprising:
an inner ring,
an outer ring, and
a bearing liner disposed therebetween,
wherein the bearing liner comprises a resin having a glass transition temperature of less than 150° C.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "glass transition temperature" as used herein encompasses the temperature at which an amorphous solid becomes soft upon heating or brittle upon cooling. The glass transition temperature is lower than the melting point of its crystalline form, if it has one. Glass transition temperature is commonly denoted "Tg". The glass transition temperatures referred to herein are measured by differential scanning calorimetery (DSC), and typically the sample is first cooled with 10 K/min and then heated with that same speed.

The term "bearing liner" as used herein encompasses a material for disposal between bearing elements to reduce friction therebetween.

The term "epoxy resin" as used herein encompasses a class of reactive pre-polymers and polymers that contain epoxide groups. Epoxy resins are also known as polyepoxides.

The term "woven fabric" as used herein encompasses a textile formed by weaving.

The term "bearing element contact surface" as used herein encompasses a surface of a bearing liner that, in use, is in sliding contact with a bearing element.

The term "self-lubricating bearing" as used herein encompasses a bearing that does not require re-lubrication. In particular, it is preferred that a dry lubricant is an integral element of the bearing material.

The inventors have surprisingly found that the bearing of the present invention may exhibit an increased working lifetime in comparison to bearings of the prior art, in particular when used in high vibration applications.

The bearing liner according to the present invention comprises a resin having a glass transition temperature of less than 150° C. A preferred example is an epoxy resin. Epoxy resins exhibit favorable levels of stiffness, toughness and fatigue resistance.

The resin may exhibit reduced stiffness and/or greater ductility compared to conventional phenolic resins. This may allow the inner and outer rings to have better conformity under load and may reduce the inner ring to outer ring contact pressure. Accordingly, in comparison to prior art liners containing phenolic resin, the rate of wear can be reduced. This results in an increased mean time between replacement (MTBR) of the bearing, thereby reducing maintenance costs.

The resin may exhibit high toughness and an improved ability to absorb energy without fracture. Accordingly, the bearing liner may exhibit higher impact resistance in comparison to bearing liners that use a phenolic resin binder. This may reduce the failure effect of a hammering (alternating) load, and may therefore provide an improved MTBR in high vibration applications. The resin may exhibit higher fatigue resistance in comparison to phenolic resin. This may reduce the failure effect of high cycle loading and may therefore contribute to improved MTBR in high vibration applications.

In view of the bearing's improved MTBR in high vibration applications, the bearing is particularly suitable for use in rotary aircraft applications, for example in flight control systems. The temperature requirements of the aerospace plain bearing specification AS81820 require that bearings must be capable of operating in the temperature range of from −55° C. to 163° C. Accordingly, prior art aerospace bearings have typically employed phenolic resins, which have glass transition temperatures greater than 150° C. However, in comparison to plain bearings in fixed wing aircraft, plain bearings in rotary aircraft are unlikely to experience temperatures above 150° C. Accordingly, when used in rotary aircraft applications, the bearings of the present application exhibit both low failure rates due to wear and high resistance to the typical operating temperatures.

A commercially available epoxy resin for use in the present invention is M77 (HexPly®). The levels of stiffness, toughness and fatigue resistance of M77 are particularly favorable.

Preferably, the liner comprises a fabric, for example a woven fabric, and the resin is impregnated into the fabric. In this manner, the resin acts as a binder or matrix for the fabric. The resin therefore provides structural integrity in the liner.

Preferably, the resin is chemically and thermally stable in a bearing application. The resin may optionally further comprise anti-wear, low friction components such as, for example, molybdenum disulphide.

The bearing liner is typically in the form of a sheet, cloth, strip or loop before it is introduced into the bearing, for example by bonding it to the bore of an outer ring.

The bearing liner may be laminated to a support layer, for example a support layer comprising glass fibers. This may allow the liner to be fixed more easily to a bearing element, for example to the bore of an outer ring.

The fabric preferably comprises a bearing element contact surface comprising lubricating fibers, and structural fibers supporting the bearing element contact surface.

In use, the lubricating fibers degrade through motion at the working surface releasing lubricant material from the fibers to the bearing element contact surface (i.e. working surface). The lubricating fibers preferably have low wear characteristics and typically have a low coefficient of friction, preferably less than 0.2, more preferably from 0.01 to 0.1. The lubricating fibers typically have a diameter of from 0.1 mm to 0.2 mm, more typically from 0.12 to 0.13 mm. The lubricating fibers are typically wefts and/or warps. The lubricating fibers may be yarns. Preferably, the lubricating fibers are chemically and thermally stable in a bearing application.

The lubricating fibers preferably comprise PTFE (polytetrafluoroethylene), graphite or graphene. These materials have a low coefficient of friction, and may therefore reduce the friction between the bearing liner and the bearing element surface to which it is in sliding contact. Accordingly, a bearing incorporating the bearing liner will exhibit smoother, more efficient operation.

The structural fibers serve to maintain the structural integrity of the liner, thereby reducing the rate of degradation of the liner. The structural fibers provide mechanical strength to support the load in the bearing application. The structural fibers typically have a diameter of from 0.1 mm to 0.5 mm, more typically from 0.2 to 0.35 mm. The structural fibers are typically wefts and/or warps. The structural fibers may be yarns. Preferably, the structural fibers are chemically and thermally stable in a bearing application.

The structural fibers support the bearing element contact surface. It is not necessary for the structural fibers to be immediately beneath the contact surface and the two may be spaced apart.

The structural fibers preferably comprise one or more of glass, carbon fiber, aramid, polyether ether ketone (PEEK), polyester, polyamide and polyphenylene sulphide (PPS). These materials are particularly effective at maintaining the structural integrity of the liner. Accordingly, the lifetime of the bearing liner may increase. Suitable aramids may include, for example, meta-aramids (e.g. Nomex™—a polymer formed from the condensation reaction of the monomers m-phenylenediamine and isophthaloyl chloride) and para-aramids (e.g. Kevlar™). The structural yarns typically have a diameter of from 0.1 mm to 0.5 mm, more typically from 0.2 to 0.35 mm. The structural yarns are typically wefts and/or warps.

The bearing liner may be laminated to a further support layer, for example a support layer comprising glass fibers.

The bearing comprises an inner ring and an outer ring. The inner ring typically sits concentrically within the outer ring. The bearing liner may be fixed to the inner ring, with the bearing element contact surface in contact with the outer ring. Alternatively, the bearing liner may be fixed to the outer ring, with the bearing element contact surface in contact with the inner ring. The inner ring may have a convex outer surface and the outer ring may have a concave inner surface. Alternatively, the inner ring may have a concave outer surface and the outer ring may have a convex inner surface. The bearing is typically a plain bearing, more typically a two-piece plain bearing. One or both of the inner and outer rings will typically be formed of a bearing steel. An example of a steel for the inner ring is AMS 5630. An example of a steel for the outer ring is AMS 5643.

The resin for use in the bearing liner in the present invention preferably has at least one of:
   an elongation ($\lambda$) of from 4 to 5%, more preferably about 4.5%;
   a modulus of resilience (Ur) of from 0.4 to 0.7 MPa, more preferably about 0.58;
   an Izod impact of from 0.2 to 0.4 J, more preferably about 0.3 J;
   a tensile strength of from 60 to 70 MPa, more preferably about 65 MPa; and
   a modulus of elasticity of from 2 to 5 GPa, more preferably about 3.1 GPa.

Such properties may improve the characteristics of the liner, for example the stiffness and/or toughness and/or fatigue resistance characteristics.

The bearing liner preferably has a flexural modulus of from 20 to 35 GPa and/or preferably a flexural strength of from 500 to 700 MPa. This may improve the characteristics of the liner, for example the stiffness and/or toughness and/or fatigue resistance characteristics. This, in turn, provides the bearing with improved MTBR in high vibration applications. The term "flexural modulus" as used herein encompasses the ratio of stress to strain in flexural deformation of a material. It is determined from the slope of a stress-strain curve produced by the flexural test ASTM D 790 (three-point bending test, procedure A). The term "flexural strength" as used herein encompasses a material's ability to resist deformation under load. It is measured according to ASTM D 790 (three-point bending test, procedure A).

The resin preferably has a glass transition temperature of from 100 to 140° C., more preferably from 120 to 130° C., even more preferably about 125° C. Lower glass transition temperatures may result in the resin being soft at typical operating temperatures of rotary aircraft. Higher temperatures may result in the resin exhibiting increased stiffness and/or reduced toughness and/or reduced fatigue resistance. Accordingly, the MTBR may be reduced.

The resin is preferably an epoxy resin. Epoxy resins exhibit favorable levels of stiffness, toughness and fatigue resistance.

The epoxy resin preferably comprises M77 (obtained from HexPly®). The levels of stiffness, toughness and fatigue resistance of M77 are particularly favorable. In addition, M77 is fast curing.

In a further aspect, the present invention provides a bearing comprising:
   a ring, and
   a bearing liner disposed on an inner surface and/or outer surface of the ring,
   wherein the bearing liner comprises a resin having a glass transition temperature of less than 150° C.

The bearing liner may be disposed on the inner surface of the ring, i.e. the "working surface" of the ring that, in use, is in sliding contact with a journal.

The bearing is preferably a self-lubricating bearing. Self-lubricating bearings incur reduced maintenance costs.

The bearing is preferably a rotary aircraft bearing, more preferably a bearing in a helicopter tail rotor. As discussed above, the bearings of the present invention exhibit improved MTBR in high vibration applications.

In a further aspect, the present invention provides a rotary aircraft, such as, for example, a helicopter, comprising the bearing as described herein.

In a further aspect, the present invention provides a method of manufacturing a bearing liner for use in the bearing of any preceding claim, the method comprising:
   providing a first fabric impregnated with a resin having a glass transition temperature of less than 150° C.;
   providing a second fabric; and
   contacting and compressing together the first and second fabrics, whereby at least some of the resin in the first fabric transfers to the second fabric.

In the contacting and compressing step, the binder-impregnated first fabric is typically pressed against the structural layer of the second fabric, i.e. the surface opposite the bearing element contact surface.

The compressing is typically carried out at an elevated temperature, for example 160-180° C. The temperature used will depend on the nature of the resin. As noted above, epoxy resins may suitably be used. The elevated temperature facilitates the amount of resin that is transferred to, and impregnates, the second fabric. The first and/or second fabric(s) is/are typically woven.

In a further aspect, the present invention provides the use of the bearing as described herein in a rotary aircraft.

BRIEF DESCRIPTION OF THE DRAWINGS

The invention will now be described with reference to the following non-limiting Figures, in which:

FIG. 3 shows a plot of the results of a unidirectional bearing test of a prior art bearing and a bearing according to the present invention.

DETAILED DESCRIPTION OF THE PRESENT INVENTION

Figure 1:
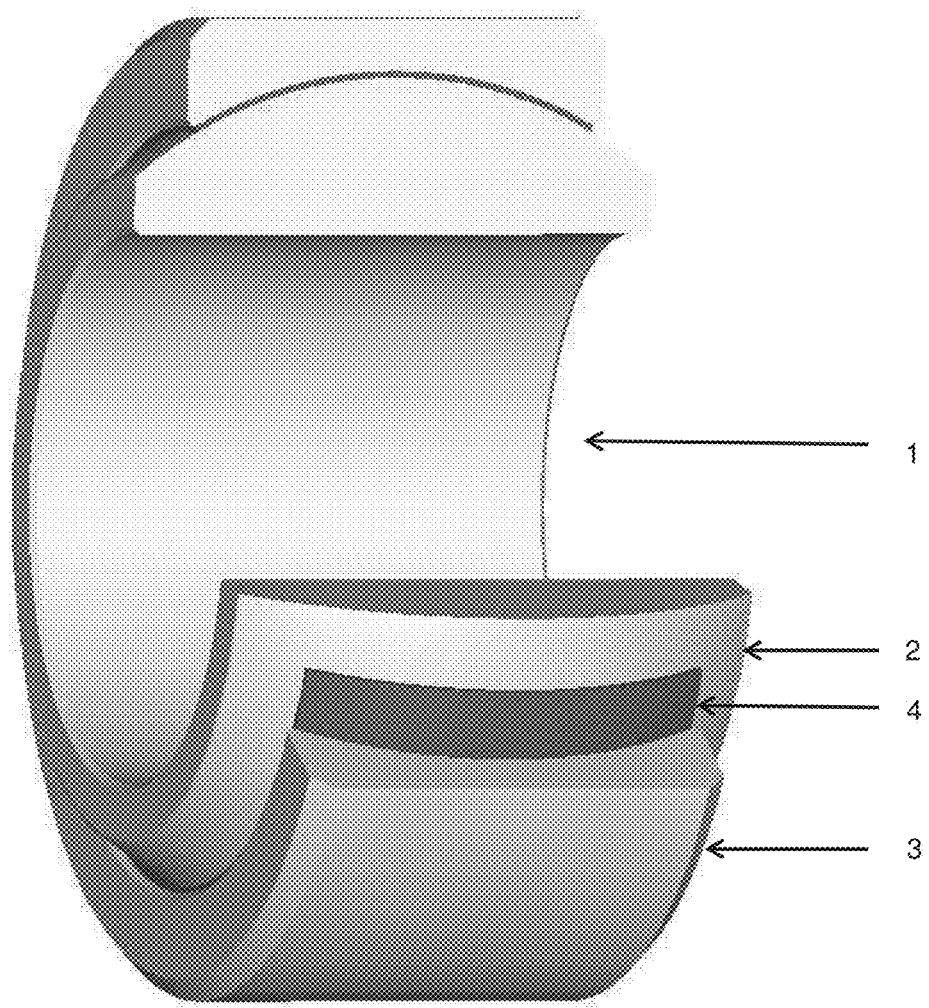
FIG. 1 shows a part-cutaway view of a bearing according to the present invention.

Referring to FIG. 1, the bearing (shown generally at 1) comprises an inner ring 2, an outer ring 3 and a bearing liner 4 disposed therebetween.

The invention will now be described in relation to the following non-limiting examples.

Example 1

A bearing liner was manufactured as follows. A woven fabric was prepared having the characteristics set out in Table 1.

TABLE 1

Characteristics of woven fabric of Comparative Example 1.

| Structural Warp Yarn | | lubricating Warp Yarn | | Structural Weft Yarn | | Lubricating Weft Yarn | |
| --- | --- | --- | --- | --- | --- | --- | --- |
| Material | Ø (mm) | Material | Ø (mm) | Material | Ø (mm) | Material | Ø (mm) |
| Glass | 0.13* | PTFE | 0.13* | Glass | 0.12* | PTFE | 0.13* |

(*Approx.)

The woven fabric was laminated with a glass fiber sheet pre-impregnated with M77 epoxy resin. The resulting laminate was compressed at an elevated temperature so that the M77 epoxy resin bled through to impregnate the woven fabric.

Comparative Example 1

A bearing liner was prepared in the same manner as Example 1 but with the M77 epoxy resin replaced by a phenolic resin.

Figure 2:
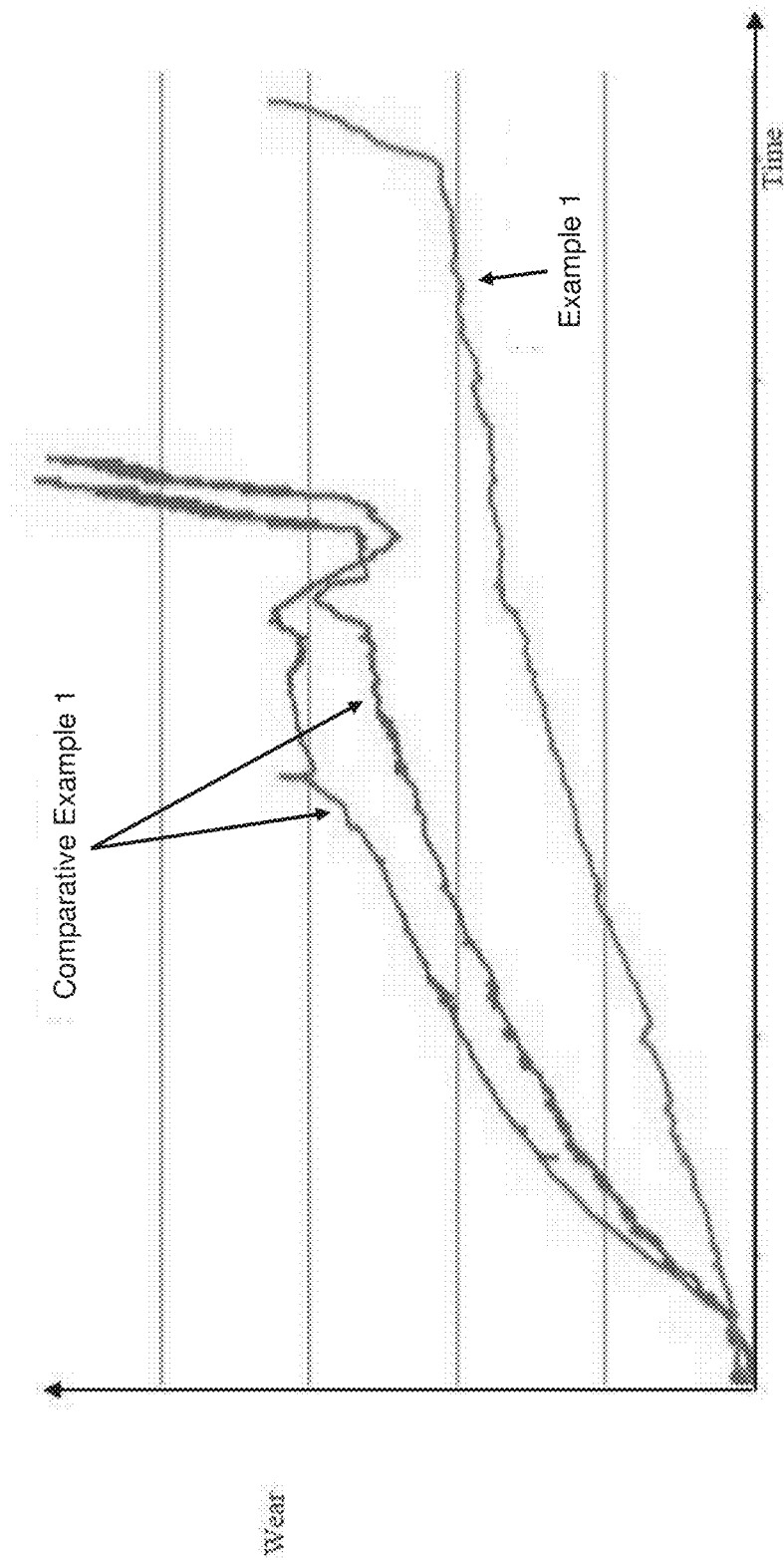
FIG. 2 shows a plot of the results of a coupon test of a prior art bearing liner and a bearing liner according to the present invention.

The bearing liners of Example 1 and Comparative Example 1 were subjected to a coupon test (flat sample test based on 15 mm^2 liner sliding on a reciprocating bar—test conditions: 80 MPa, ±10.5 mm, 2 Hz), and the results are shown in FIG. 2 (Comparative Example 1 was tested twice). It can be seen that the working lifetime of the bearing liner of Example 1 was greater than the working lifetime of the bearing liner Comparative Example 1.

Example 2

A bearing liner was prepared in the same manner as Example 1. It was then placed between an inner ring and an outer ring to form a bearing.

Comparative Example 2

A bearing liner was prepared in the same manner as Comparative Example 1. It was then placed between an inner ring and an outer ring to form a bearing.

The bearings of Example 2 and Comparative Example 2 were subjected to a unidirectional bearing test (±5° rotation, projected pressure 50 MPa, oscillating at 25 Hz), and the results are shown in FIG. 3 (Comparative Example 2 was tested four times, Example 2 was tested twice). It can be seen that the working lifetime of the bearing of Example 2 was greater than the working lifetime of the bearing of Comparative Example 2.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing comprising:
   an inner ring,
   an outer ring, and
   a first fabric impregnated with a resin having a glass transition temperature of less than 150° C.,
   a second fabric,
   a bearing liner formed by contacting and compressing together the first fabric and the second fabric, whereby at least some of the resin in the first fabric transfers to the second fabric, the bearing layer being disposed between the inner ring and the outer ring.

2. The bearing of claim 1, wherein the resin has a glass transition temperature of from 100° C. to 140° C.

3. The bearing of claim 1, wherein the resin has a glass transition temperature of from 120° C. to 130° C.

4. The bearing of claim 1, wherein the resin is an epoxy resin.

5. The bearing of claim 1, wherein the first fabric is a woven fabric.

6. The bearing of claim 5, wherein the woven fabric comprises:
   a bearing element contact surface comprising lubricating fibers, and
   structural fibers supporting the bearing element contact surface.

7. The bearing of claim 6, wherein the lubricating fibers comprise PTFE or graphite.

8. The bearing of claim 6, wherein the structural fibers comprise at least one of:
   glass,
   carbon fiber,
   aramid,
   polyether ether ketone,
   polyester,
   polyamide, and
   polyphenylene sulphide.

9. A bearing comprising:
   a ring,
   a first fabric impregnated with a resin having a glass transition temperature of less than 150° C.,
   a second fabric, and
   a bearing liner formed by contacting and compressing together the first fabric and the second fabric, whereby at least some of the resin in the first fabric transfers to the second fabric, the bearing layer being disposed on at least one of an inner surface and an outer surface of the ring.

10. The bearing of claim 9, wherein the bearing is a self-lubricating bearing.

11. The bearing of claim 9, wherein the bearing is a rotary aircraft bearing.

12. The bearing of claim 11, wherein the rotary aircraft bearing is integrated into a rotary aircraft.

13. A method of manufacturing a bearing liner for use in a bearing, the method comprising:
   providing a first fabric impregnated with a resin having a glass transition temperature of less than 150° C.,
   providing a second fabric, and
   contacting and compressing together the first fabric and the second fabric, whereby at least some of the resin in the first fabric transfers to the second fabric,
   integrating the bearing liner into a bearing, wherein the bearing comprises:
      an inner ring, and
      an outer ring,
   wherein the bearing liner is disposed between the inner ring and the outer ring.

\* \* \* \* \*